US008323817B2

(12) United States Patent  
Gordon (10) Patent No.: US 8,323,817 B2
(45) Date of Patent: Dec. 4, 2012

(54) ALKALI METAL SEAWATER BATTERY (75) Inventor: John Howard Gordon, Salt Lake City, UT (US)

(73) Assignee: Ceramatec, Inc., Salt Lake City, UT (US)

( * ) Notice: Subject to any disclaimer, the term of this patent is extended or adjusted under 35 U.S.C. 154(b) by 412 days.

(21) Appl. No.: 12/558,363

(22) Filed: Sep. 11, 2009

(65) Prior Publication Data

US 2010/0068629 A1 Mar. 18, 2010

Related U.S. Application Data (60) Provisional application No. 61/096,605, filed on Sep. 12, 2008.

(51) Int. Cl.
*H01M 6/34* (2006.01)
*H01M 4/00* (2006.01)
*H01M 10/16* (2006.01)
*H01M 4/13* (2010.01)
*H01M 4/68* (2006.01)
*H01M 2/16* (2006.01)

(52) U.S. Cl. ....... 429/119; 429/66; 429/208; 429/231.9; 429/231.95; 429/247

(58) Field of Classification Search .................. 429/119, 429/66, 208, 247, 231.9, 231.95
See application file for complete search history.

(56) References Cited

U.S. PATENT DOCUMENTS

| | | | |
|---|---|---|---|
| 1,501,756 A | 7/1924 | Downs | |
| 3,660,170 A | 5/1972 | Rampel | |
| 3,785,965 A | 1/1974 | Welty | |
| 3,787,315 A | 1/1974 | Bearden, Jr. et al. | |
| 3,788,978 A | 1/1974 | Bearden, Jr. et al. | |
| 3,791,966 A | 2/1974 | Bearden | |
| 3,970,472 A | 7/1976 | Steffensen | |
| 4,041,215 A | 8/1977 | Kormanyos et al. | |
| 4,053,371 A | 10/1977 | Towsley et al. | |
| 4,076,613 A | 2/1978 | Bearden, Jr. | |
| 4,207,391 A | 6/1980 | Church et al. | |
| 4,244,986 A | 1/1981 | Paruso et al. | |

(Continued)

FOREIGN PATENT DOCUMENTS

JP 59-75985 4/1984

(Continued)

OTHER PUBLICATIONS

Lee, Kang Young "International Search Report", International App. No. PCT/US2010/055718, (Jun. 21, 2011),1-3.

(Continued)

*Primary Examiner* — Patrick Ryan
*Assistant Examiner* — Julian Anthony
(74) *Attorney, Agent, or Firm* — David Fonda (57) ABSTRACT

A galvanic cell is disclosed. Generally, the cell includes an alkali metal anode, which electrochemcially oxidizes to release alkali metal ions, and a cathode, which is configured to be exposed to an electrolyte solution. A water-impermeable, alkali-ion-conductive ceramic membrane separates the anode from the cathode. Moreover, an alkali-ion-permeable anode current collector is placed in electrical communication with the anode. In some cases, to keep the anode in contact with the current collector as the cell functions and as the anode is depleted, the cell includes a biasing member that urges the anode against the current collector. To produce electricity, the galvanic cell is exposed to an aqueous electrolyte solution, such as seawater, brine, saltwater, etc.

49 Claims, 7 Drawing Sheets

U.S. PATENT DOCUMENTS

| | | | |
|---|---|---|---|
| 4,298,666 A | 11/1981 | Taskier | |
| 4,307,164 A | 12/1981 | Church et al. | |
| 4,372,823 A | 2/1983 | Church et al. | |
| 4,465,744 A | 8/1984 | Susman et al. | |
| 4,479,856 A | 10/1984 | Ando | |
| 4,542,444 A | 9/1985 | Boland | |
| 4,546,055 A | 10/1985 | Coetzer et al. | |
| 4,623,597 A | 11/1986 | Sapru et al. | |
| 4,828,939 A * | 5/1989 | Turley et al. | 429/405 |
| 4,842,963 A | 6/1989 | Ross, Jr. et al. | |
| 5,057,206 A | 10/1991 | Engel et al. | |
| 5,213,908 A | 5/1993 | Hagedorn | |
| 5,290,405 A | 3/1994 | Joshi et al. | |
| 5,342,709 A | 8/1994 | Yahnke et al. | |
| 5,516,598 A | 5/1996 | Visco et al. | |
| 5,525,442 A * | 6/1996 | Shuster | 429/320 |
| 5,541,019 A | 7/1996 | Anani et al. | |
| 5,580,430 A | 12/1996 | Balagopal et al. | |
| 5,686,201 A | 11/1997 | Chu | |
| 5,695,632 A | 12/1997 | Brons et al. | |
| 5,780,186 A | 7/1998 | Casey, Jr. | |
| 5,856,047 A | 1/1999 | Venkatesan et al. | |
| 5,882,812 A | 3/1999 | Visco et al. | |
| 5,935,421 A | 8/1999 | Brons et al. | |
| 6,017,651 A | 1/2000 | Nimon et al. | |
| 6,025,094 A | 2/2000 | Visco et al. | |
| 6,030,720 A | 2/2000 | Chu et al. | |
| 6,110,236 A | 8/2000 | Tsang et al. | |
| 6,153,328 A | 11/2000 | Colborn | |
| 6,159,634 A | 12/2000 | Yen et al. | |
| 6,165,644 A | 12/2000 | Nimon et al. | |
| 6,200,704 B1 | 3/2001 | Katz et al. | |
| 6,210,564 B1 | 4/2001 | Brons et al. | |
| 6,210,832 B1 | 4/2001 | Visco et al. | |
| 6,214,061 B1 | 4/2001 | Visco et al. | |
| 6,225,002 B1 | 5/2001 | Nimon et al. | |
| 6,248,476 B1 | 6/2001 | Sun et al. | |
| 6,248,481 B1 | 6/2001 | Visco et al. | |
| 6,265,100 B1 | 7/2001 | Saaski et al. | |
| 6,291,090 B1 | 9/2001 | Kuznetsov et al. | |
| 6,310,960 B1 | 10/2001 | Saaski et al. | |
| 6,355,379 B1 | 3/2002 | Ohshita et al. | |
| 6,358,643 B1 | 3/2002 | Katz et al. | |
| 6,368,486 B1 | 4/2002 | Thompson et al. | |
| 6,376,123 B1 | 4/2002 | Chu | |
| 6,402,795 B1 | 6/2002 | Chu et al. | |
| 6,413,284 B1 | 7/2002 | Chu et al. | |
| 6,413,285 B1 | 7/2002 | Chu et al. | |
| 6,416,903 B1 | 7/2002 | Fierro et al. | |
| 6,432,584 B1 | 8/2002 | Visco et al. | |
| 6,537,701 B1 | 3/2003 | Nimon et al. | |
| 6,610,440 B1 | 8/2003 | LaFollette et al. | |
| 6,632,573 B1 | 10/2003 | Nimon et al. | |
| 6,737,197 B2 | 5/2004 | Chu et al. | |
| 6,787,019 B2 | 9/2004 | Jacobson et al. | |
| 6,852,450 B2 | 2/2005 | Hwang et al. | |
| 6,881,234 B2 | 4/2005 | Towsley | |
| 6,911,280 B1 | 6/2005 | De Jonghe et al. | |
| 6,955,753 B1 | 10/2005 | Gomez | |
| 6,955,866 B2 | 10/2005 | Nimon et al. | |
| 6,991,662 B2 | 1/2006 | Visco et al. | |
| 7,070,632 B1 | 7/2006 | Visco et al. | |
| 7,144,654 B2 | 12/2006 | LaFollette et al. | |
| 7,166,384 B2 | 1/2007 | LaFollette et al. | |
| 7,214,443 B2 | 5/2007 | Clarke et al. | |
| 7,259,126 B2 | 8/2007 | Gordon et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,390,591 B2 | 6/2008 | Visco et al. | |
| 7,432,017 B2 | 10/2008 | Visco et al. | |
| 7,482,096 B2 | 1/2009 | De Jonghe et al. | |
| 7,491,458 B2 | 2/2009 | Visco et al. | |
| 8,012,621 B2 | 9/2011 | Joshi et al. | |
| 8,088,270 B2 | 1/2012 | Gordon et al. | |
| 2002/0150818 A1 | 10/2002 | Amatucci et al. | |
| 2004/0197641 A1 | 10/2004 | Visco et al. | |
| 2004/0229107 A1 | 11/2004 | Smedley | |
| 2005/0109617 A1 | 5/2005 | Ono et al. | |
| 2005/0175894 A1 | 8/2005 | Visco et al. | |
| 2006/0096893 A1 | 5/2006 | De Almeida et al. | |
| 2006/0141346 A1 | 6/2006 | Gordon et al. | |
| 2006/0177732 A1 | 8/2006 | Visco et al. | |
| 2006/0257734 A1 | 11/2006 | Obata et al. | |
| 2007/0048610 A1 | 3/2007 | Tsang et al. | |
| 2007/0048617 A1 | 3/2007 | Inda | |
| 2007/0172739 A1 | 7/2007 | Visco et al. | |
| 2007/0221265 A1 | 9/2007 | Affinito et al. | |
| 2007/0259235 A1 | 11/2007 | Jacobson et al. | |
| 2008/0268327 A1 | 10/2008 | Gordon et al. | |
| 2009/0061288 A1 | 3/2009 | Gordon et al. | |
| 2009/0134842 A1 | 5/2009 | Joshi et al. | |
| 2009/0136830 A1 | 5/2009 | Gordon | |
| 2009/0189567 A1 | 7/2009 | Joshi et al. | |
| 2010/0239893 A1 | 9/2010 | Gordon et al. | |
| 2010/0285372 A1 | 11/2010 | Lee et al. | |
| 2011/0104526 A1 | 5/2011 | Boxley et al. | |
| 2012/0040274 A1 | 2/2012 | Gordon | |
| 2012/0126752 A1 | 5/2012 | Joshi et al. | |
| 2012/0141856 A1 | 6/2012 | Gordon et al. | |

FOREIGN PATENT DOCUMENTS

| | | |
|---|---|---|
| JP | 62186470 | 8/1987 |
| JP | 08321322 A | 12/1996 |
| JP | 2001-307709 | 11/2001 |
| JP | 2002-245847 A | 8/2002 |
| KR | 2004047664 | 6/2004 |
| KR | 100651246 | 8/2005 |
| KR | 20070021110 A | 2/2007 |
| KR | 2007028588 | 3/2007 |
| WO | WO2005038953 | 4/2005 |
| WO | WO-2005/091946 | 10/2005 |

OTHER PUBLICATIONS

Lee, Kang Young "Written Opinion", International App. No. PCT/US2010/055718, (Jun. 21, 2011),1-3.

Goodenough, J.B. et al., "Fast Na+ -Ion Transport in Skeleton Structures", *Mat. Res. Bull.*, vol. 11, Pergamon Press, Inc. Printed in the United States,(1976),203-220.

Hong, H.Y-P. et al., "Crystal Structures and Crystal Chemistry in the System Na1+xZr2SixP3-x012", *Mat. Res. Bull.*, vol. 11, 1976. Pergamon Press, Inc. Printed in the United States.,(1976),173-186.

Bentzen, J. J., et al., "The preparation and characterization of dense, highly conductive Na5GdSi4O12 nasicon (NGS)", *Materials Research Bulletin*, vol. 15,(1980),1737-1745.

Delmas, C. et al., "Crystal chemistry of the Na1+xZr2-xLx(PO4)3 (L= Cr. In, Yb) solid solutions", *Materials Research Bulletin*, vol. 16,(1981),285-290.

Von Alpen, V. et al., "Compositional dependence of the electrochemical and structural parameters in the NASICON system (Na1+xSixZr2P3-xO12)", *Solid State Ionics*, vol. 3/4,(1981),215-218.

Fujitsu, S. et al., "Conduction paths in sintered ionic conductive material Na1+xYxZr2-x(PO4)3", *Materials Research Bulletin*, vol. 16,(1981),1299-1309.

Saito, Y. et al., "Ionic Conductivity of NASICON-type conductors Na1.5M0.5Zr1.5(PO4)3 (M: Al3+, Ga3+, Cr3+, Sc3+, Fe3+, In3+, Yb3+, Y3+)", *Solid State Ionics*, vol. 58,(1992),327-331.

Alamo, J. "Chemistry and properties of solids with the [NZP] skeleton", *Solid State Ionics*, vol. 63-65,(1993),547-561.

Shimazu, K. et al., "Electrical conductivity and Ti4+ ion substitution range in NASICON system", *Solid State Ionics*, vol. 79, (1995),106-110.

Miyajima, Y. et al., "Ionic conductivity of NASICON-type Na1+xMxZr2-xP3O12(M: Yb, Er, Dy)", *Solid State Ionics*, vol. 84,(1996),61-64.

Manickam, Minakshi et al., "Lithium insertion into manganese dioxide electrode in MnO2/Zn aqueous battery Part I. A preliminary study", *Journal of Power Sources*, vol. 130, Issues 1-2 (Obtained through ScienceDirect),(May 2004),254-259.

Sumathipala, et al., "Novel Li+ Ion Conductors and Mixed Conductors, Li3+xSixCr1-xO4 and a Simple Method for Estimating Li+/e-Transport Numbers", *J. Electrochem. Soc.*, vol. 142, No. 7,(Jul. 1995),2138-2143.

Kowalczk, et al., "Li-air batteries: A classic example of limitations owing to solubilities", *Pure Appl. Chem.*, vol. 79, No. 5,(2007),851-860.

Read, "Characterization of the Lithium/Oxygen Organic Electrolyte Battery",*J. Electrochem. Soc.*,vol. 149, No. 9,(2002),A1190-A1195.

Panero, et al., "High Voltage Lithium Polymer Cells Using a PAN-Based Composite Electrolyte", *J. Electrochem. Soc.*, vol. 149, No. 4,(2002),A414-A417.

Dissanayake, et al., "Lithium ion conducting Li4-2xGe1-xSxO4 solid electrolytes", *Solid State Ionics*, 62,(1993),217-223.

Balagopal, et al., "Selective sodium removal from aqueous waste streams with NaSICON ceramics", *Separation and Purification Technology*, 15,(1999),231-237.

Sagane, et al., "Li+ and Na+ transfer through interfaces between inorganic solid electrolytes and polymer or liquid electrolytes",*Journal of Power Sources*, 146,(2005),749-752.

Wang, et al., "LiTi2(PO4)3 with NASICON-type structure as lithium-storage materials", *Journal of Power Sources*, 124,(2003),231-236.

Dissanayake, et al., "New solid electrolytes and mixed conductors: Li3+xCr1-xMxO4: M=Ge, Ti", *Solid State Ionics*, 76,(1995),215-220.

Kerr, "Polymeric Electrolytes: An Overview", *Lithium Batteries: Science and Technology*, Chapter 19, edited by Nazri and Pistoia, Kluwer Academic Publishers,(2004),574-622.

Young, Lee W., "International Search Report", PCT Search Report for App. No. PCT/US 07/21978, (Oct. 10, 2008),1-2.

Young, Lee W., "Written Opinion of the International Searching Authority", PCT Written Opinion for App. No. PCT/US 07/21978, (Oct. 10, 2008),1-5.

Young, Lee W., "International Search Report", PCT Search Report for App. No. PCT/US 08/10435, (Nov. 25, 2008),1-2.

Young, Lee W., "Written Opinion of the International Searching Authority", PCT Written Opinion for App. No. PCT/US 08/10435, (Nov. 25, 2008),1-4.

Fu, "Effects of M3+ Ions on the Conductivity of Glasses and Glass-ceramics in the system Li2O-M2O3-GeO2-P2O5 (M=Al, Ga, Y, Dt, Gd, and La)", *Communications of the American Ceramic Society*, vol. 83, No. 4, (Apr. 2000),104-106.

Thokchom, et al., "Superionic Conductivity in a Lithium Aluminum Germanium Phosphate Glass-Ceramic", *Journal of the Electrochemical Society*, 155 (12), (Oct. 8, 2008),A915-A920.

Fu, "Fast Li+ Ion Conducting Glass Ceramics in the System Li2O-Al2O3-TiO2-P2O5", *Science Direct, Solid State Ionics*, vol. 104, Issues 3-4, (Dec. 11, 1997),191-194.

Saienga, et al., "The Comparative Structure, Property, and Ionic Conductivity of LiI+Li2S+GeS2 Glasses Doped with Ga2S3 and La2S3", *Journal of Non-Crystalline Solids*, vol. 354, 14, (Mar. 1, 2008),Abstract.

Wang, et al., "Polymer Composite Electrolytes Containing Active Mesoporous SiO2 Particles", *Journal of Applied Physics*, 102, (2007),1-6.

Wang, et al., "Li1.3Al0.3Ti1.7(PO4)3 Filler Effect on (PEO)LiClO4 Solid Polymer Electrode", *Department of Materials Science and Engineering, Zhejiang University*, (2004),Abstract.

Kim, "International Search Report", International App. No. PCT/US2008/084707, (Apr. 29, 2009),1-3.

Kim, "Written Opinion of the International Searching Authority", International App. No. PCT/US2008/084707, (Apr. 29, 2009),1-4.

Park, Jin "Written Opinion of the International Searching Authority Mailed on Jun. 30, 2009", Int. App. No. PCT/US2008/084572, 1-3.

Park, Jin "International Search Report Mailed on Jun. 30, 2009", Int. App. No. PCT/US2008/084572, 1-3.

Kim, Jun Hak "Written Opinion of the International Searching Authority Mailed on Aug. 24, 2009", Int. App. No. PCT/US2009/032458, 1-4.

Kim, Jun Hak "International Search Report Mailed on Aug. 24, 2009", Int. App. No. PCT/US2009/032458, 1-3.

Apicella, Karie O., "Office Action for U.S. Appl. No. 12/323,165", (Jun. 1, 2011),1-10.

Cantelmo, Gregg "Office Action for U.S. Appl. No. 11/944,719", (Dec. 27, 2010),1-8.

Cullen, Sean P., "Office Action for U.S. Appl. No. 12/205,759", (Apr. 13, 2011),1-15.

Cullen, Sean P., "Office Action for U.S. Appl. No. 12/205,759", (Sep. 16, 2010),1-22.

IPDL Machine Translation of JP08-321322A, 1-10.

Kalafut, Stephen J., "Office Action for U.S. Appl. No. 11/871,824", (Dec. 10, 2010),1-7.

Kalafut, Stephen J., "Office Action for U.S. Appl. No. 11/871,824", (May 25, 2010),1-8.

Parsons, Thomas H., "Office Action for U.S. Appl. No. 12/022,381", (May 24, 2011),1-11.

Wu, Xian Ming et al., "Preparation and characterization of lithium-ion-conductive Li(1.3)Al(0.3)Tl(1.7)(PO4)3 thin films by the solution deposition", *Thin Solid Films 425*, (2003),103-107.

Yoshimura, et al., "IPDL Machine Translation of JP-2001-307709", IPDL Machine Translation of JP-2001-307709, (Nov. 2, 2001),1-12.

Imanaka, Nobuhito "IPDL Machine Translation of JP 2002-245847 A", IPDL Machine Translation of JP 2002-245847 A, (Aug. 30, 2002),1-6.

Park, Jin "International Search Report", PCT App. No. US2008/084728 (Corresponding to U.S. Appl. No. 12/323,165), (Jun. 30, 2009),1-3.

Park, Jin "Written Opinion of the International Searching Authority", PCT App. No. US2008/084728 (Corresponding to U.S. Appl. No. 12/323,165), (Jun. 30, 2009),1-3.

Inda, Yasushi "Bibliography and Abstract (English Language)", Korean patent application publication KR20040047664, (Jun. 5, 2004),1.

Inda, Yasushi "Bibliography and Abstract (English Language)", Korean Patent Application Publication KR20070028588, (Mar. 12, 2007),1.

Apicella, Karie O., "Final Office Action", U.S. Appl. No. 12/323,165, (Sep. 8, 2011),1-11.

Cullen, Sean P., "Non-Final Office Action", U.S. Appl. No. 12/725,319, (Jan. 6, 2012),1-10.

Cullen, Sean P., "Final Office Action", U.S. Appl. No. 12/723,319, (Apr. 27, 2012),1-12.

Cho, Jun B., "International Search Report", PCT App. No. US2010/027535 (Corresponding to U.S. Appl. No. 12/725,319), (Oct. 20, 2010),1-4.

Cho, Jun B., "Written Opinion of the International Searching Authority", PCT App. No. US2010/027535 (Corresponding to U.S. Appl. No. 12/725,319), (Oct. 20, 2010),1-5.

Ryu, et al., "Bibliographical Data and Abstract (English Language)", Application Publication for US2007154814, Corresponding to KR10-0651246, (Aug. 22, 2005),1.

Wiedemann, Eric "Supplementary European Search Report", European Patent Application No. 10754004.9 (Corresponding to U.S. Appl. No. 12/725,319), (May 16, 2012),1-6.

Suzuki, et al., "Bibliographical Data and Abstract (English Language)", Japanese Patent application JP62-186470, (Aug. 14, 1987),1-2.

Jang, Sung W., "International Search Report", PCT/US2011/046143 (Corresponding to U.S. Appl. No. 13/195,431), (Feb. 27, 2012),1-3.

Jang, Sung W., "Written Opinion of the International Searching Authority", PCT/US2011/046143 (Corresponding to U.S. Appl. No. 13/195,431), (Feb. 27, 2012), 1-3.

Kabe, T. et al., "Hydrodesulfurization and Hydrodenitrogenation", *Wiley-VCH (1999)*, 37, 110-112.

Task Force on Strat. Uncnv. Fuel, "America's Strategic Unconventional Fuels, vol. III Resource and Technology Profiles", *America's Strategic Unconventional Fuels, vol. III Resource and Technology Profiles* (completed Feb. 2007, Published Sep. 2007)., Full text available at http://www.unconventionalfuels.org/publications/reports/Volume_III_ResourceTechProfiles(Final).pdf,III-25.

Sonoda, et al., "Bibliographical Data and Abstract (English Translation)", Japanese Patent Application JP-59-75985, (Apr. 28, 1984),1-2.

Kim,Yeon-Gyeong "PCT International Search Report", Int. App. No. PCT/US2009/056781, (Mar. 2, 2010),1-4.

Kim, Yeon-Gyeong "PCT Written Opinion", Int. App. No. PCT/US2009/056781, (Mar. 2, 2010),1-3.

Armand, Michel et al., "ionic-liquid materials for the electrochemical challenges of the future", *Nature Materials*, (Jul. 24, 2009),621-629.

Doyle, Kevin P., et al., "Dentrite-Free Electrochemical Deposition of Li-Na Alloys from an Ionic Liquid Electrolyte", *Journal of the Electrochemical Society*, (May 2006),A1353-A1357.

Kim, K et al., "Electrochemical Investigation of Quaternary Ammonium/Aluminum Chloride Ionic Liquids", *Journal of the Electrochemical Society*, (Jun. 2004),A1168-A1172.

Kim, Ketack et al., "The Role of Additives in the Electroreduction of Sodium Ions in Chloroaluminate-Based Ionic Liquids", *Journal of the Electrochemical Society*, (Dec. 2004),E9-E13.

Lang, Christopher M., et al., "Cation Electrochemical Stability in Chloroaluminate Ionic Liquids", *J. Phys. Chem.*, (2005),19454-19462.

Salminen, Justin et al., "Ionic liquids for rechargeable lithium batteries", *Lawrence Berkeley National Laboratory*, (Sep. 21),1-19.

\* cited by examiner

ALKALI METAL SEAWATER BATTERY

CROSS-REFERENCE TO RELATED APPLICATIONS

This application claims the benefit of U.S. Provisional Application No. 61/096,605, filed Sep. 12, 2008, entitled "Li-Seawater Battery Using Lithium Conductive Membranes," the entire disclosure of which is hereby incorporated by reference.

FIELD OF THE INVENTION

The present invention relates in general to batteries. More particularly, the present invention provides a galvanic cell that comprises an alkali metal anode, an alkali-ion-conductive membrane, and a cathode. To produce electricity, the cathode is exposed to an aqueous electrolyte solution, such as seawater.

BACKGROUND OF THE INVENTION

Batteries are known mechanisms that are used to store and release electrical energy for a variety of uses. In order to produce electricity, batteries typically change chemical energy directly into electrical energy. Generally, a single battery includes one or more galvanic cells, wherein each cell is made of 2 half-cells that are electronically isolated except through a circuit but in communication with one another ionically by a conductive electrolyte containing anions and cations. During discharge, the redox reaction that powers the battery, electrochemical reduction occurs at the cathode, while electrochemical oxidation occurs at the anode. While the cathode and anode do not physically touch each other, they are ionically connected by one or more electrolytes, which can be either solid or liquid. When an external electrical circuit is connected to terminals that are connected to the anode and cathode, the battery provides the circuit with electrical energy by driving electrons through the circuit.

Currently, many different types of batteries are used as power sources. Some non-limiting examples of conventional batteries include alkaline batteries, lithium batteries, lead-acid batteries, zinc batteries, etc. Additionally, conventional batteries have become a common power source for a wide variety of applications. For instance, batteries have become a common power source in a myriad of household, industrial, medical, and military applications—to name a few.

While conventional batteries do serve as suitable power sources in a wide variety of applications, many conventional batteries have shortcomings. In one example, certain batteries require that all of a battery's reactants to be disposed within the battery. As a result, such batteries can be relatively heavy. Along these lines, such batteries can have relatively low specific energies. In other words, such batteries may produce a relatively small amount of energy per mass unit of the battery. In another example, certain batteries are capable of providing power for a relatively short period of time.

Thus, while many types of batteries currently exist, challenges still exist, including those previously mentioned. Accordingly, it would be an improvement in the art to augment or even replace certain current batteries with other batteries.

BRIEF SUMMARY OF THE INVENTION

The present invention provides a galvanic cell that comprises an alkaline metal and which functions when placed in an aqueous electrolyte solution, such as seawater. Generally, the galvanic cell comprises an anode and a cathode that are separated by an alkali-ion-conductive membrane. In some implementations, the cathode is disposed adjacent to an exterior surface of the ion-conductive membrane while an electronically-insulative separator is disposed adjacent to an interior surface of the membrane. In such implementations, an anode current collector is disposed between the insulative separator and the anode to allow the current collector to gather current from the anode. When the cathode is exposed to the electrolyte solution, the anode electrochemically oxidizes to release alkali ions, which pass through the membrane to the cathode. As this oxidation process occurs, the anode is depleted and shrinks in size. In order to keep the anode in electrical communication with the anode current collector, in some implementations, the galvanic cell comprises a biasing member that urges the anode against the anode current collector.

The anode may comprise any suitable alkali metal that electrochemcially oxidizes to form alkali metal ions. In some preferred implementations, however, the anode comprises lithium or sodium. Additionally, the cathode may comprise any suitable material that allows the cathode to reduce the electrolyte solution so as to produce hydrogen gas, hydroxide ions, and/or to perform any other suitable reaction. In some preferred implementations, the cathode comprises nickel, titanium, a cermet material (e.g., ceramic metal composite such as a Ni/NaSICON, a Ni/LiSICON, or similar material), and/or an electro-catalyst coating such as platinum that increases the cathode's ability to evolve hydrogen gas.

The alkali-ion-conductive membrane may comprise any suitable material that is both impermeable to water and capable of selectively transporting ions from anode to the cathode. In some implementations in which the anode comprises lithium, the ion-conductive membrane comprises a LiSICON membrane and/or a lithium-ion-conductive glass ceramic. LiSICON is an ionically conductive material selective to lithium ions. In one embodiment, the LiSICON comprises a class of lithium conductive ceramics which include: $Li_{2+2x}Zn_{1-x}GeO_4$ ($-0.36<x<0.87$), $Li_{14}ZnGe_4O_{16}$, and slight variations in stoichiometry and with amounts of cation substitution. LiSICON may also include the lithium aluminum titanium phosphate family of compositions including, but not limited to, ceramic membranes having the formula $Li_{1+x}Al_xTi_{2-x}(PO_4)_3$, where x is between 0.0 and 0.5; and $Li_{1+x+4y}Al_xTi_{1-x-y}(PO_4)_3$ where x and y are between 0.0 and 0.5 and where slight substitutions of cations may be made to improve properties. The lithium-ion-conductive glass ceramic may include but are not limited to compositions in the lithiumaluminosilicate glass ceramics and $Li_{1.5}Al_{0.5}Ge_{1.5}(PO_4)_{3-x}Li_2O$ ($x=0.0$-$0.20$).

Similarly, in some implementations in which the anode comprises sodium, the ion-conductive membrane comprises a NaSICON membrane and/or a sodium-ion-conductive glass ceramic membrane. NaSICON is an ionically conductive material selective to sodium ions. In certain embodiments NaSICON compositions may included but are not limited to $Na_3Zr_2Si_2PO_{12}$, $Na_{1+x}Si_xZr_2P_{3-x}O_{12}$ (x from 1.6 to 2.4), Y-doped Nasicon ($Na_{1+x+y}Zr_{2-y}Y_ySi_xP_{3-x}O_{12}$, $Na_{1+x}Zr_{2-y}Y_ySi_xP_{3-x}O_{12-y}$, where $x=2$, $y=0.12$) and Fe-doped Nasicon ($Na_3Zr_{2/3}Fe_{4/3}P_3O_{12}$).

The anode current collector may comprise one or more of a variety of materials that can collect current from the anode, contact the anode without being reduced, and allow alkali ions from the anode to pass therethrough. Some non-limiting examples of suitable anode current collector materials include reduced, or pure, copper, a suitable cermet material (e.g., a Cu/NaSICON, a Cu/LiSICON, etc.), and one or more other suitable materials.

As previously mentioned, in some implementations, the described galvanic cell optionally comprises an electronically-insulative separator. In such implementations, the separator may help to prevent the anode from reducing one or more constituents of the ion-conductive membrane. The separator may comprise any suitable material, including, but not limited to, a micro-porous mesh that is infiltrated with an organic solvent and an alkali salt, a solid polymer electrolyte, and combinations thereof, or a porous layer of the membrane material.

In some implementations, the cell further comprises a biasing member that urges the anode against the anode current collector. While the biasing member can include any suitable mechanism that allows it to perform its intended function, some non-limiting examples of suitable biasing members may include one or more springs and/or inflatable bladders.

Although the cell can comprise any suitable shape, in some implementations, the ion-conductive membrane comprises a hollow, three-dimensional conical, hemispherically domed, or pyramidal structure having an interior and an exterior surface. This hollow, three-dimensional structure may provide the cell with several beneficial characteristics. For instance, the conical, hemispherically domed, or pyramidal shape of the membrane may increase the surface area of the anode that is kept in electrical communication with the anode current collector as the anode is oxidized and depleted.

In such implementations, one or more of the other components of the cell may have shapes that correspond to the shape of the membrane. For instance, the cathode may be shaped to extend around the exterior surface of the membrane, while the insulative separator and/or the anode current collector can be shaped to form conically-shaped layers that are disposed adjacent to the membrane's interior surface. Moreover, the anode may have a cone shape that allows it to contact an interior surface of the anode current collector.

In addition to the aforementioned components and characteristics, the cell can be varied in any suitable manner. For example, the cell may be joined to one or more other cells to form a battery of cells. In this example, the cells may be organized such that as hydrogen gas is evolved from the cells, electrolyte containing an alkali hydroxide is moved away from the cathodes while fresh electrolyte solution is drawn into contact with the cathodes.

While the described systems and methods have proven particularly useful for the production of batteries comprising a lithium or sodium anode, the skilled artisan will recognize that the described methods may be modified to produce batteries comprising anodes made from one or more other alkali metals. For example, instead of using lithium or sodium in the anode, the skilled artisan will recognize that the anode may comprise potassium or some other suitable alkali metal. Also, in one embodiment, the anode current collector resides between the anode and membrane. In other embodiments, the current collector resides anywhere on the surface or within the anode.

These features and advantages of the present invention will become more fully apparent from the following description and appended claims, or may be learned by the practice of the invention as set forth hereinafter.

BRIEF DESCRIPTION OF THE SEVERAL DRAWINGS

In order that the manner in which the above-recited and other features and advantages of the invention are obtained and will be readily understood, a more particular description of the invention briefly described above will be rendered by reference to specific embodiments thereof that are illustrated in the appended drawings. Understanding that the drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of suitable alkali-ion-conductive membranes, anode materials, cathode materials, electrolyte solutions, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1A:
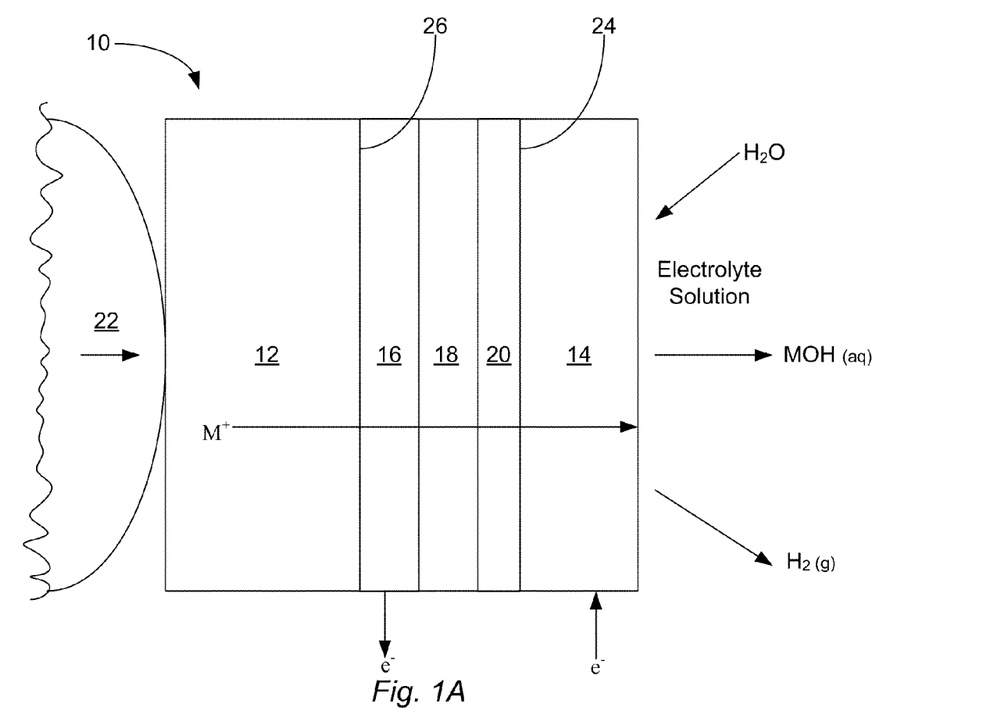
FIG. 1A depicts a schematic diagram of a representative embodiment of a galvanic cell comprising an alkali-ion-conductive membrane.

The present invention provides a galvanic cell. While the cell can comprise any suitable component, FIG. 1A shows a non-limiting embodiment in which the galvanic cell 10 comprises an alkali metal anode electrode 12 and a cathode electrode 14 that are separated, respectively, by an anode current collector 16, an electronically-insulative separator 18, and an alkali-ion-conductive membrane 20. Additionally, FIG. 1A shows the cell 10 can comprise a biasing member (e.g., an inflatable bladder 22) that urges the anode 12 against the anode current collector 16. The separator 18 is optional and may be omitted, especially if the membrane's electronic conductivity is low or the membrane is non-reactive with the anode.

The galvanic cell may function in any suitable manner. According to some embodiments, FIG. 1A shows that when the cathode 14 is exposed to an aqueous electrolyte solution (including, but not limited to, seawater, brine, saltwater, ionically conductive freshwater, and any other suitable electrolyte solution), water may be reduced at the cathode 14 to produce hydrogen gas ($H_2$) and hydroxide ions ($OH^-$) through the reaction $H_2O+e^- \rightarrow \frac{1}{2}H_2+OH^-$. Alternatively at the cathode, if the aqueous electrolyte solution is slightly acidic, the cathode reaction may be $H^++e^- \rightarrow \frac{1}{2}H_2$. Moreover, as the cell 10 functions, FIG. 1A shows that the anode 12 is oxidized to release electrons ($e^-$) and to release alkali metal ions (shown as $M^+$) through the reaction $M \rightarrow M^++e^-$ (wherein M represents any suitable alkali metal). FIG. 1A also shows that the alkali ions $M^+$ from the anode 12 can be selectively transported through the alkali-ion-conductive membrane 20 to the cathode 14 to form an alkali hydroxide (shown as MOH). Additionally, FIG. 1A shows that as the cell 10 functions, electrons $e^-$ flow from the anode current collector 16 to the cathode 14 through an electrical circuit (not shown) to produce an electrical current. To provide a better understanding of the galvanic cell, the aforementioned components of the cell are described below in more detail.

The anode 12 may comprise any suitable alkali metal that is capable of losing electrons and oxidizing to release alkali metal ions $M^+$ as the cell functions. Some non-limiting examples of suitable anode materials may include lithium, sodium, potassium, and other alkali metals or alloys containing such alkali metals, for example LiAl or NaAl or alkali metals combined with electronically conductive materials stable with the alkali metals such as carbon or graphite. In some presently preferred embodiments, however, the anode comprises lithium or sodium. For instance, where the anode comprises sodium, sodium in the anode can be oxidized to help the cell produce electricity according to the oxidation reaction $Na \rightarrow Na^++e^-$ and the overall reaction $Na+H_2O \rightarrow NaOH+\frac{1}{2}H_2$, or if the cathode electrolyte is slightly acidic the overall reaction may be $Na+HX \rightarrow NaX+\frac{1}{2}H_2$, where X is an anion. Similarly, where the anode comprises lithium, lithium in the anode can be oxidized to help the cell to produce electricity according to the oxidation reaction $Li \rightarrow Li^++e^-$ and the overall reaction $Li+H_2O \rightarrow LiOH+\frac{1}{2}H_2$, or if the cathode electrolyte is slightly acidic the overall reaction may be $Li+HX \rightarrow LiX+\frac{1}{2}H_2$, where X is an anion.

The cathode can comprise any suitable material that allows it to reduce the electrolyte solution to produce hydrogen gas and hydroxide ions or to perform any other suitable reaction such as to produce hydrogen gas from protons. Some non-limiting examples of suitable cathode materials include nickel, titanium, a cermet material, and other known or novel cathode materials that are capable of evolving hydrogen gas and/or hydroxide ions when the cathode is exposed to the electrolyte solution. In some presently preferred embodiments, the cathode comprises nickel and/or a cermet material (as described below). That said, in some embodiments, the cathode is also coated with an electro-catalyst, such as platinum, that increases the cathode's ability to evolve hydrogen. By way of non-limiting example, the cathode may comprise platinized nickel, platinized titanium, a platinized cermet, and/or one or more other suitable platinized materials.

The cathode can have any characteristic that allows it to function as intended. Indeed, in some embodiments, the cathode comprises a mesh structure, a porous structure, a microporous structure, or some other structure that provides the cathode with a relatively large surface area and helps reduce the interface resistance at between the ion-conductive membrane and the cathode. In fact, in some presently preferred embodiments, the cathode comprises a mesh structure.

As previously mentioned, in some embodiments, the cathode comprises a cermet material or a highly porous ceramic/metal composite. In such embodiments, the cermet material may serve various purposes. In one example, the ceramic material in the cermet functions as a continuously-ionically-conductive phase that reduces the cathode's resistance to the transport of alkali ions from the anode. In another example, the metal in the cermet material acts as a continuous current-conductive phase that allows the cathode to collect current. In still another example, the porosity of the cermet may allow the electrolyte solution to penetrate the cathode and contact the ion-conductive membrane to further decrease the ion resistivity at the interface between the cathode and the ion-conductive membrane. In yet another example, the porosity of the cermet increases the surface area of cathode and provides the cathode with a good three-phase boundary exchange for reactants in both liquid and gas phases. For instance, as the cell functions, the porosity of the cermet may allow gases (e.g., hydrogen) and liquids (e.g., MOH) to enter and escape from the cathode.

Where the cathode comprises a cermet material, the cermet material may comprise any suitable substance. Indeed, the ceramic material in the cermet may comprise any ion-conductive material that is capable of selectively transporting cations from anode. For example, where the anode comprises lithium, the ceramic material in the cermet may comprise any suitable LiSICON (Lithium Super Ion Conductor) ceramic. In another example, where the anode comprises sodium, the ceramic material in the cermet may comprise any suitable NaSICON (Sodium Super Ion Conductor) ceramic. Additionally, the metal in the cermet may comprise any suitable metal that allows the cell to function properly. Examples of suitable metals in the cermet material include, but are not limited to, nickel, molybdenum, cobalt, copper, titanium, and titanium dioxide. In some embodiments where the anode comprises lithium and the cathode comprises a cermet material, the cermet material comprises a nickel/LiSICON cermet. Likewise, in some non-limiting embodiments where the anode comprises sodium, the cermet material comprises a nickel/NaSICON cermet.

In some embodiments, the cermet material contains platinum deposited on the surface to catalyze or facilitate electrochemical reactions, such as hydrogen evolution. Platinum may be coated on the cermet by a chemical plating process. In one non-limiting example, the cermet material is placed in a platinum salt solution, such as chloroplatinic acid ($H_2PtCl_6 \cdot (H_2O)_6$) along with a reducing agent, such as hydrazine, which will reduce the platinum salt and deposit platinum on the surface of the cermet. In one embodiment, a galvanic cell, comprises an anode comprising lithium, wherein the anode electrochemcially oxidizes to release lithium ions. The anode may comprise a cermet material. An anode current collector is in electrical communication with the anode. In some preferred embodiments, the anode current collector is in contact with the anode. The anode current collector may be porous. The galvanic cell includes a cermet cathode suitable to evolve hydrogen from an aqueous electrolyte solution. A NaSICON ceramic membrane that is impermeable to water comprises a hollow, three-dimensional tapered conical, hemispherically domed, or pyramidal structure having an interior surface and an exterior surface. The anode is disposed adjacent to the interior surface and the cathode is disposed adjacent to the exterior surface. The galvanic cell may include a biasing member that urges the anode against a surface of the current collector as the anode is depleted.

In another embodiment, a galvanic cell includes a sodium metal anode that electrochemcially oxidizes to release sodium metal ions. An anode current collector is in electrical communication or contact with the anode. The galvanic cell includes a cathode suitable to evolve hydrogen from an aqueous electrolyte solution. The cell includes a sodium-ion-conductive ceramic membrane that is impermeable to water that separates the anode from the cathode. A biasing member may urge the anode against a surface of the current collector as the anode is depleted.

In one embodiment, the biasing member is a flexible membrane that is impermeable to water. A liquid comprising water backfills behind the flexible membrane as the cell discharges. The galvanic cell is configured to maintain a near neutral buoyancy with respect to aqueous environments throughout the life of the cell.

The cermet may be formed and attached to the membrane by many possible ways. One possible method is disclosed in Example 4, below.

While FIG. 1A shows that the cathode 14 is disposed on an outside surface 24 of the ion-conductive membrane 20, the cathode 14 can be disposed in any suitable location. For instance, instead of being in direct contact with the outer surface 24 of the membrane, a layer of a cermet material or some other suitable ion-conductive material may be placed between the cathode 14 and the membrane 20.

With respect to the anode current collector, the current collector may comprise any suitable material that allows it to collect current from the anode and allows alkali ions from the anode to pass therethrough. Some non-limiting examples of suitable current collector materials comprise copper, a cermet material (e.g., a copper/LiSICON cermet, where the anode comprises lithium, a copper/NaSICON cermet, where the anode comprises sodium, etc.), gold, platinum, and any other suitable material. In some embodiments, the anode current collector is also non-reducible by the anode. For example, the anode current collector can comprise a material, such as pure copper, that has already been reduced.

The anode current collect can have any characteristic that allows it to function as intended. Indeed, in some embodiments, the anode current collector comprises a mesh structure with a flattened surface. In such embodiments, the alkali ions may be able to pass through the pores in the mesh structure. Additionally, in some such embodiments, the anode may slide across the flattened surface of the collector as the cell functions and as the anode is depleted. In other embodiments, the anode current collector comprises one or more or metal strips or perforated sheets. In some embodiments the gaps and pores in the anode current collector may be filled with liquid electrolyte. In such embodiments, the alkali ions from the anode may pass through the spaces between the metal strips or the perforations in the sheets. Moreover, in some such embodiments, the anode may slide across a surface of the metal strips or perforated sheet as the cell functions and the anode is depleted.

While FIG. 1A shows the anode current collector 16 is disposed adjacent to an outside surface 26 of the anode 12, the anode current collector 16 may be disposed in any suitable location that allows alkali ions from the anode to flow as intended and that further allows the collector to electrically contact the anode in a manner that allows the collector to gather current from the anode as the cell functions. By way of example, the anode current collect may be disposed on any surface of the anode. In still another non-limiting example, the current collector may be disposed within the anode.

Regarding the electronically-insulative separator, FIG. 1A shows that, in some embodiments, the cell 10 optionally comprises the insulative separator 18. While the separator may perform any suitable function, in some instances, the separator helps prevent the anode from reducing the constituents of the alkali-ion-conductive membrane (discussed below). The insulative separator may comprise any electronically-insulative material that allows alkali ions from the anode to pass through it and that allows it to prevent the alkali-ion conductive material from being reduced by the anode. Some non-limiting examples of suitable materials used in the insulative separator include a micro-porous mesh, an organic solvent comprising an alkali salt containing the same alkali metal as the anode, and/or a solid polymer electrolyte.

Where the insulative separator comprises a micro-porous mesh, the micro-porous mesh may comprise any suitable material that allows it to function as intended. In one example, the separator comprises a micro-porous mesh, such as a CELGARD® separator, produced by Celgard, Inc., Japan, that has an organic solvent with a lithium salt (where the anode comprises lithium) or a sodium salt (where the anode comprises sodium) infiltrated into its pores. In this example, the organic solvent can include, but is not limited to, polypropylene carbonate, ethylene carbonate, tretraglyme, and/or a variety of other polar solvents. Additionally, in this example, the lithium salt or sodium salt may respectively comprise any lithium salt (e.g., $LIPF_6$ or LiX, where X is an anion that is suitable to combine with lithium to form a salt) or sodium salt (e.g., NaX, where X is an anion that is suitable of combining with sodium to form a salt) that is suitable for use in a lithium or sodium battery.

Where the insulative separator comprises a solid polymer electrolyte, the separator may comprise any suitable material that allows the separator to function as intended. In one non-limiting example, the separator comprises a polyethylene oxide in which a suitable lithium salt (e.g., LiX, in the case of a lithium anode) or sodium salt (e.g., NaX, in the case of a sodium anode) is intermixed. In this example, the lithium salt or sodium salt may be intermixed in the solid polymer electrolyte at any suitable molecular ratio. Indeed in some instances, the alkali salt is mixed into the polymer electrolyte at a molecular ratio between about 1:4 and about 1:20.

The alkali-ion-conductive ceramic membrane may comprise any suitable ceramic membrane that prevents the cathode electrolyte solution from contacting the anode and which allows alkali ions from the anode to be selectively transported from the anode, through the membrane, to the cathode. Some non-limiting examples of suitable alkali-ion-conductive membranes include alkali super ion conductor membranes and/or glass ceramic membranes. For instance, where the anode comprises lithium, the alkali-ion-conductive membrane may comprise any suitable type of LiSICON membrane (including, but not limited to, ceramic membranes having the formula $Li_{1+x}Al_xTi_{2-x}(PO_4)_3$, where x is between 0.0 and 0.5). Indeed, where the membrane comprises a LiSICON membrane, the membrane may comprise, but is not limited to, a LTP-B LiSICON and/or a LPT-45B LiSICON membrane, as produced by Ceramatec, Inc, Salt Lake City, Utah. In other instances in which the alkali-ion-conductive membrane comprises a lithium-ion-conductive ceramic membrane, the membrane can include, but is not limited to, a lithium β alumina and/or glass ceramic membrane. As stated above, LiSICON is a class of lithium conductive ceramics which include: $Li_{2+2x}Zn_{1-x}GeO_4$ (−0.36<x<0.87), $Li_{14}ZnGe_4O_{16}$, and slight variations in stoichiometry and with amounts of cation substitution. LiSICON also includes the lithium aluminum titanium phosphate family of compositions including, but not limited to, ceramic membranes having the formula $Li_{1+x}Al_xTi_{2-x}(PO_4)_3$, where x is between 0.0 and 0.5; and $Li(1+x+4y)Al_xTi(1-x-y)(PO4)_3$ where x and y are between 0.0 and 0.5 and where slight substitutions of cations may be made to improve properties. The lithium-ion-conductive glass ceramic may include but are not limited to compositions in the lithiumaluminosilicate glass ceramics and $Li_{1.5}Al_{0.5}Ge_{1.5}(PO_4)_3$-$xLi_2O$ (x=0.0-0.20).

Similarly, in some implementations in which the anode comprises sodium, the ion-conductive membrane comprises a NaSICON membrane and/or a sodium-ion-conductive glass ceramic membrane. NaSICON compositions may include but are not limited to $Na_3Zr_2Si_2PO_{12}$, $Na_{1+x}Si_xZr_2P_{3-x}O_{12}$ (x from 1.6 to 2.4), Y-doped Nasicon $(Na_{1+x+y}Zr_{2-y}Y_ySi_xP_{3-x}O_{12}$, $Na_{1+x}Zr_{2-y}Y_y\,Si_xP_{3-x}O_{12-y}$, where x=2, y=0.12) and Fe-doped Nasicon $(Na_3Zr_{2/3}Fe_{4/3}P_3O_{12})$.

Additionally, in some embodiments in which the alkali-ion-conductive membrane comprises a sodium-ion-conductive ceramic membrane, the membrane may comprise a sodium β alumina membrane.

In some embodiments where the membrane comprises a LiSICON or a NaSICON membrane, the membrane also includes a variety of dopants to improve the strength, conductivity, and/or sintering characteristics of the membrane. In such embodiments, the LiSICON or NaSICON membrane may comprise any suitable dopant, including, but not limited to, Zr, Si, Mg, Ca, Sr, Ba, and/or non-stoichiometric amounts of Li (or Na, where the anode comprises sodium), Al, Ti, and/or P.

In some embodiments, the alkali-ion-conductive membrane comprises a plurality of layers to ensure that membrane is water impermeable and the electrolyte solution does not contact and corrode the anode. In such embodiments, the membrane may have any suitable number of layers, including 2, 3, 4, 5, or more. For example, FIG. 1B shows a non-limiting embodiment in which the alkali-ion-conductive membrane 20 comprises 4 layers, namely 2 middle layers 28 and 30, which comprise a core 32, and 2 outer layers 34 and 36, which coat the core 32.

Where the alkali-ion-conductive membrane (e.g., a LiSICON or a NaSICON membrane) comprises more than one layer, each layer may have any suitable characteristic. In one example, one or more layers of the membrane are non-porous while one or more other layers of the membrane are porous. For instance, in the embodiment shown in FIG. 1B the inner layers 28 and 30 can be non-porous while the outer layers 34 and 36 can be porous. Where the membrane comprises a non-porous and a porous layer, each layer may perform any suitable function. For instance, the non-porous layer may act to seal the membrane and prevent the electrolyte solution from contacting and corroding the anode. Additionally, the porous layer may act to strengthen and protect the non-porous layer. Moreover, the porous layer may also have a higher alkali-ion conductivity than the non-porous layer. For instance, where the non-porous layer has an ion conductivity between about 0.1 and about 0.3 mS/cm (e.g., about 0.2±0.05 mS/cm), the porous layer may have a conductivity between about 0.6 and about 1.4 mS/cm (e.g., 1.0±0.3 mS/cm). Accordingly, placing a porous layer as an outer coating on a non-porous core may act to reduce the interfacial resistance of the membrane and to increase the interfacial surface area of the membrane.

Figure 1B:
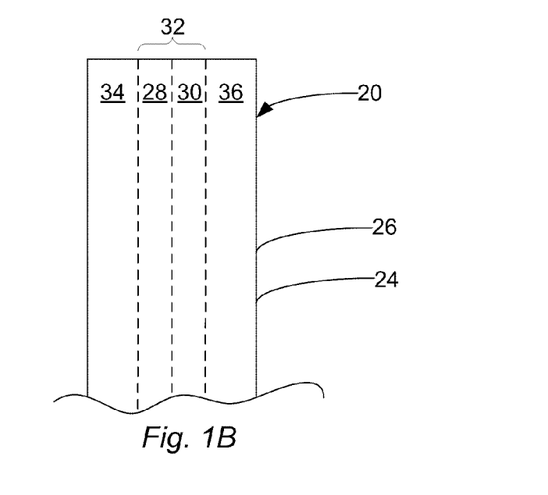
FIG. 1B depicts a schematic diagram of a representative embodiment of the alkali-ion-conductive membrane.

FIG. 1B shows that, in some embodiments, the core 32 can comprise more than one non-porous layer (e.g., 28 and 30). Thus, in the event that one layer of the core comprises a pinhole or another defect, one or more additional non-porous layers may prevent the electrolyte solution from penetrating through the membrane to the anode.

Where one or more layers of the membrane (e.g., LiSICON or NaSICON) are porous the layers may have any suitable amount of porosity. In some embodiments, a porous layer of the membrane has a porosity between about 0.2 and about 50%. In other embodiments, a porous layer of the membrane has a porosity between about 0.5 and about 5%. In still other embodiments, a porous layer of the membrane has a porosity between about 1 and about 2%.

Figures 2A, 2B:
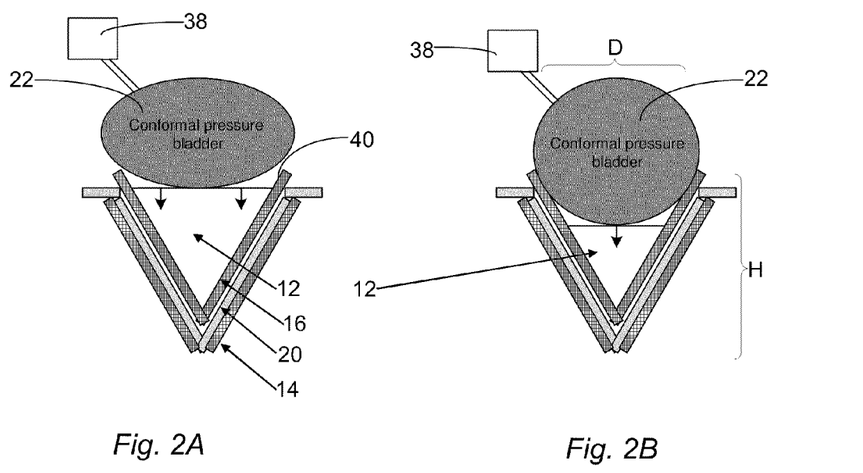
FIGS. 2A-2B depict cross-sectional views of a representative embodiment of the galvanic cell, wherein the cell comprises an inflatable bladder.

As previously mentioned, in some embodiments, the galvanic cell comprises a biasing member. In such embodiments, the biasing member may serve any suitable purpose, including, but not limited to, urging the anode against the anode collector and/or sealing a portion of the cell from the electrolyte. In general, the biasing member may comprise any suitable component that allows it to urge the anode against the anode current collector as the cell functions and the anode is depleted. Some non-limiting examples of suitable biasing members comprise one or more springs, spring-like members, elastic members, and/or inflatable bladders. FIGS. 2A and 2B show that in at least one embodiment, the biasing member comprises an inflatable bladder 22.

Where the biasing member comprises an inflatable bladder 22, the inflatable bladder may have any suitable characteristic that allows it to urge the anode 12 against the anode current collector 16. In one example, the inflatable bladder 22 comprises a compartment that allows the bladder to be filled with a gas and/or fluid. In another example, the bladder comprises a pressure gauge that functions to maintain the pressure within the bladder substantially constant while volume of the bladder expands to force the anode, which decreases in size as it is oxidized, against the anode current collector. In still another example, the bladder is closed and comprises a fixed amount of fluid and/or gas. In yet another example, FIGS. 2A and 2B show an embodiment in which the bladder 22 is connected to reservoir 38 that is filled with a pressurized fluid. Accordingly, FIG. 2B shows the bladder 22 may increase in size (from its original size in FIG. 2A) to force the anode 12 against the cathode current collector 16 as the size of the anode decreases. Among the suitable materials for the bladder is a metalized polymer film such as aluminum coated high density polyethylene. Among one of the better liquids to fill behind the bladder is seawater. Seawater is especially suitable when the alkali metal is sodium because the metal and the liquid have very similar specific gravities, thus as sodium anode is depleted and back filled with seawater, the over specific gravity of the battery remains nearly constant and neutral with respect to buoyancy.

The various components of the cell can have any suitable shape that allows the cell to function as intended. Indeed, in some embodiments, the ion-conductive membrane comprises a two-dimensional and/or a three-dimensional shape. Where the membrane comprises a three-dimensional shape, the membrane may have any suitable characteristic. For example, the membrane may comprise a hollow, three-dimensional tapered conical, hemispherical domed, or pyramidal structure having an interior surface and an exterior surface. As used herein, the term conical may refer to any shape that tapers from a widest part of the shape towards a single point. It is not limited to structures having a circular cross-section. FIGS. 2A through 3B illustrate different non-limiting views in which the membrane 20 is substantially conical in shape.

In some embodiments, the shape of one or more other components of the cell corresponds to the shape of the membrane. For example, FIGS. 2A and 2B illustrate that where membrane 20 is substantially conical in shape, the cathode 14 can also is substantially conical in shape so as to cover at least a portion of the exterior surface 24 (shown in FIG. 3A) of the membrane. In another example, the insulative separator (not shown in FIGS. 2A and 2B) can also be substantially conical in shape so that it can conform to the interior surface of the membrane and allow the anode current collector 16 to fit within the separator. In still another example, FIG. 2A shows that the anode current collector 16 can be substantially conical in shape so as to fit within the interior space of the membrane 20 and/or the interior space of the insulative separator 18 (not shown in FIGS. 2A and 2B). In a final example, FIG. 2A shows that the anode 12 can have a cone shape that corresponds to the conical shape of the anode current collector 16. In this final example, the cone shape of the anode 12 allows the anode 12 to have a relatively large surface area in contact with the anode current collector 16. Additionally, in this final example, the cone shape of the anode 12 allows it to slide across the interior surface 40 of the anode current collector 16 as the anode 12 is oxidized and depleted.

The various components of the cell may be any suitable size and may be scaled as desired to provide a cell with a desired capacity. For example, FIG. 2A illustrates that where the membrane 20 comprises a substantially conical shape, the membrane 20 may have any suitable diameter D at its widest point and any suitable height H. In some embodiments, the membrane has a diameter D between about 0.1 and about 100 cm. In other embodiments, the membrane has a diameter D between about 1 and about 20 cm. In still other embodiments, the membrane has a diameter D between about 1.5 and about 15 cm. Similarly, in some embodiments, the membrane has a height H that is between about 0.1 and 100 cm. In other embodiments, the membrane has a height H between about 1 and about 20 cm. In still other embodiments, the membrane has a height H that is between about 1 and about 20 cm. Indeed, in some embodiments in which the membrane is substantially conical in shape, the diameter D and height H of the membrane are preferably greater than about 4 cm.

In addition to the aforementioned components, the galvanic cell may comprise any other suitable component that allows the cell to function as intended. In one example, the cell comprises a mechanism for introducing and/or maintaining an amount of oxygen into the electrolyte solution. In such embodiments, the mechanism for introducing and/or maintaining oxygen in the cathode electrolyte may serve any suitable purpose, including increasing the voltage output of the cell. For example, where oxygen is present in the electrolyte, oxygen and water may be reduced at cathode through the reaction $\frac{1}{4}O_2 + \frac{1}{2}H_2O + e^- \rightarrow OH^-$ to increase the voltage output of the cell. The introduction of oxygen in the cathode electrolyte may be inadvertent if the device is operated in seawater at or near the atmospheric interface.

Figure 3A:
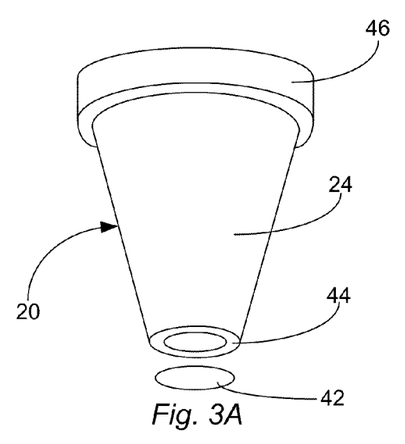
FIGS. 3A-B depict perspective views of some representative embodiments of the alkali-ion-conductive membrane.
Figure 3B:
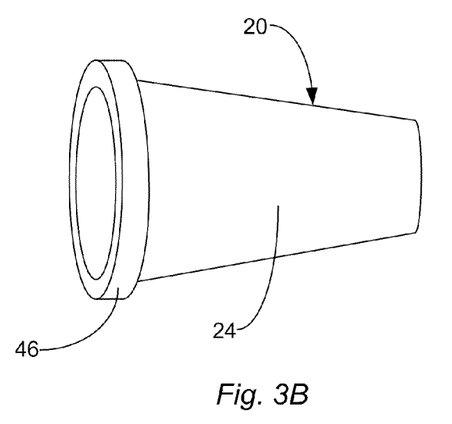

In another example, FIGS. 3A and 3B illustrate that in some embodiments in which the membrane 20 is substantially conical in shape, the membrane 20 has an end cap 42. In this example, the end cap can serve any suitable purpose. For instance, the end cap may comprise a material (including, but not limited to, a ceramic) that is impermeable to water. Thus, the end cap can prevent the electrolyte solution from contacting the anode through an end (shown as end 44 in FIG. 3A) of the membrane 20.

Figure 4:
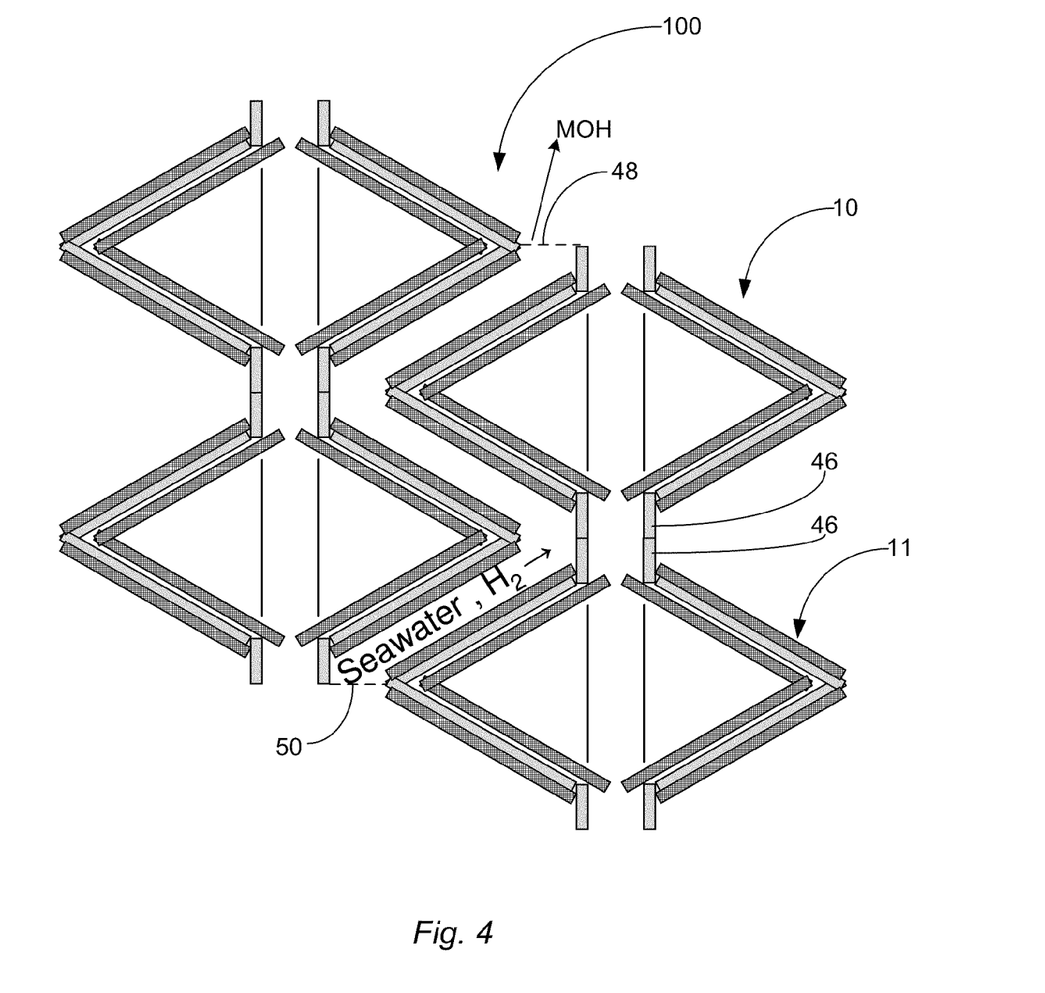
FIG. 4 depicts a cross-sectional view of a representative embodiment of a battery comprising a plurality of the galvanic cells.

In still another example, FIGS. 3A and 3B illustrate that in some embodiments, the cell 10 (e.g., the membrane 20) may comprise a flange 46. In such embodiments, the flange may serve any suitable purpose. For instance, the flange can be used to connect the cell to a manifold or to one or more other cells in any suitable manner. By way of illustration, FIG. 4 shows a non-limiting embodiment in which the flange 46 of one cell 10 is connected to the flange 46 of another cell 11.

While multiple cell flanges can be connected to each other in any suitable manner, in some embodiments, the flange on one cell is connected to the flange of one or more cells through a multi-layer, flexible polymer having a low permeability to water. In such embodiments, the flexible polymer may act as a barrier that helps prevent the electrolyte in contact with the cathode from contacting the anode. In other embodiments, the flanges of a plurality of cells are joined to another non-permeable material (including, but not limited to, a manifold comprising a glass, a ceramic, or another non-permeable material). For a more detailed description of a possible method for connecting the flange of one cell to one or more other cells, see "Low-cost Flexible Packaging for High Power Li-ion HEV Batteries," published by Argonne National Laboratories; the entire disclosure of which is hereby incorporated by reference.

Where multiple of the described galvanic cells are connected together, the cells may be connected in any suitable configuration. In some preferred embodiments, however, the cells are connected together in a manner that allows hydrogen gas evolved from the cathodes to bubble off the cathodes and create a natural pumping effect that draws fresh electrolyte into contact with the cathodes while it flushes old electrolyte (e.g., electrolyte comprising an alkali hydroxide MOH) away from the cathodes. FIG. 4 illustrates one such embodiment. Specifically, FIG. 4 shows that as hydrogen gas ($H_2$) is evolved at the cathodes 14, the hydrogen gas bubbles through battery and helps push alkali hydroxides out of an upper outlet 48 in the battery 100. As the hydrogen gas and electrolyte comprising the alkali hydroxides (MOH) exit the battery 100, FIG. 4 shows that a fresh electrolyte solution (e.g., seawater) is drawn into the battery through an inlet 50 at the bottom of the battery 100.

Figure 5:
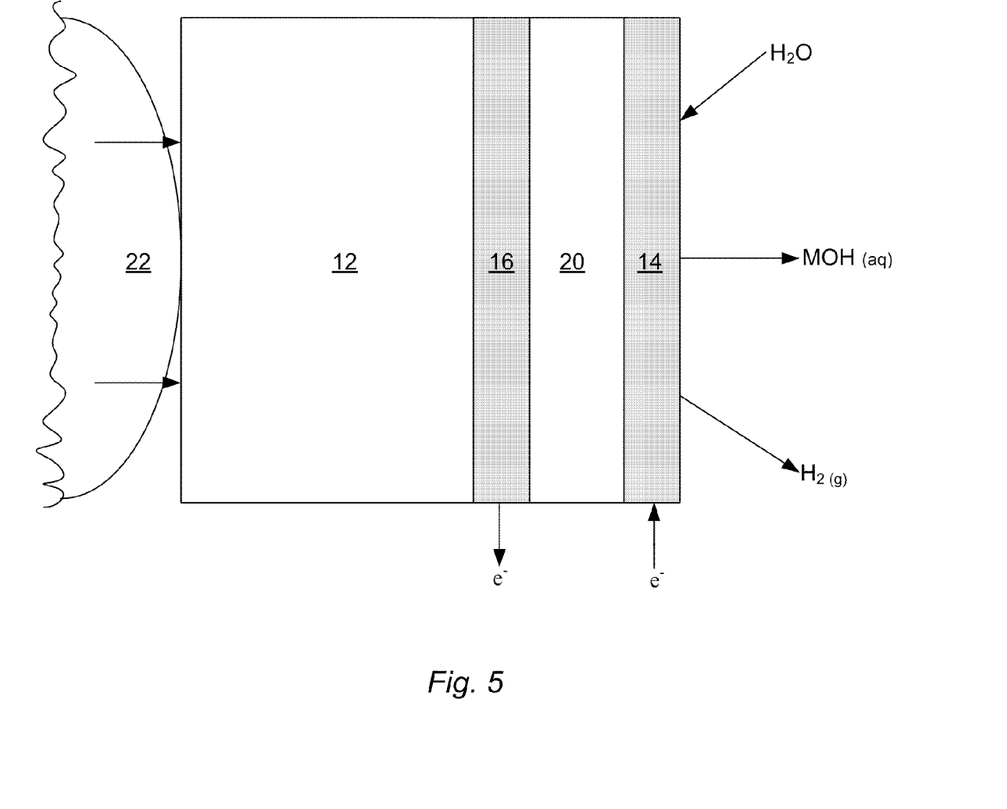
FIG. 5 depicts a schematic diagram of a representative embodiment of the galvanic cell, wherein the cell comprises a cermet material that acts as a cathode current collector.

The described systems and methods can be varied in any suitable manner. In one example, the cell need not comprise the described insulative separator. While the cell can function in any suitable manner without the insulative separator, FIG. 5 shows that where the anode current collector 16 comprises a cermet material (e.g., a LiSICON or NaSICON/nickel cermet), the current collector can be placed directly between the anode 12 and the membrane 20, without the separator.

In another example, the cell can be varied to use one or more cermet materials in any suitable manner. For instance, FIG. 5 illustrates an embodiment in which a copper/LiSICON or copper/NaSICON cermet serves as the anode current collector 16. Similarly, FIG. 5 shows an embodiment in which a nickel LiSICON or nickel/NaSICON cermet serves as the anode. In still other instances, however, an additional cermet layer may be placed on either side of the anode current collector, the insulative separator (where present), and/or the cathode.

The described cell can be made in any suitable manner. By way of example, the various components of the cell can be wrapped, cut, sintered, stamped, molded, extruded, or otherwise formed. For instance, the alkali-ion-conductive membrane may be formed by wrapping green ceramic tapes (e.g., one or more LiSICON membrane tapes, NaSICON membrane tapes, alkali-ion-conductive glass ceramic membrane tapes, etc.) around a mandrel in the shape of a cone, hemispherical dome, or pyramid. In this manner, various tapes may be used to provide the membrane with a plurality of layers that have different characteristics (e.g., non-porous and porous layers). After the ceramic tapes have been wrapped, the tapes can be sintered to form a final ceramic membrane structure, which may be tested for hermicity. After the ion-conductive membrane is formed, the additional components of the cell (e.g., the cathode, insulative separator, anode current collector, anode, biasing member, end cap, etc.) may be assembled to form the cell.

The described cell may also be used in any suitable manner. In one non-limiting example, the cell is used to power one or more components of a marine vehicle, such as an unmanned submarine. Because the cell may obtain some of its needed reactants, namely the electrolyte solution, from its aquatic environment, the cell may have a relatively high specific energy that allows it to provide marine vehicles with more energy per mass unit than many competing batteries that are required to contain all of their reactants.

The described systems and methods may have several beneficial characteristics. In one example, the described galvanic cell can be configured to be well suited for neutral buoyancy applications. For instance, because sodium has a specific gravity that is only slightly less than sea water, providing the cell with a sodium anode may help neutralize the cell's buoyancy. In such cases, where the biasing member comprises an inflatable bladder, the bladder may be filled with sea water. Thus, as sodium in the anode is consumed, an equal volume of sea water is added to the inflatable bladder. The weight of the sodium being consumed is offset by sea water added to the bladder, thereby neutralizing the cell's buoyancy.

The following examples are given to illustrate various embodiments within the scope of the present invention. These are given by way of example only, and it is understood that the following examples are not comprehensive or exhaustive of the many types of embodiments of the present invention that can be prepared in accordance with the present invention.

EXAMPLES

Example 1

Figure 6A:
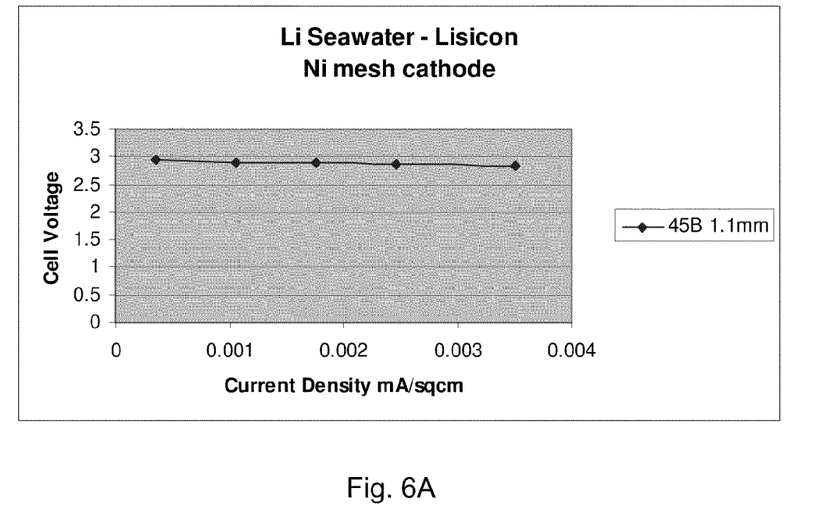
FIGS. 6A-6B contain graphs depicting non-limiting experimental results in which cell voltage for some embodiments of the galvanic cell is plotted against current density for the cells.
Figure 6B:
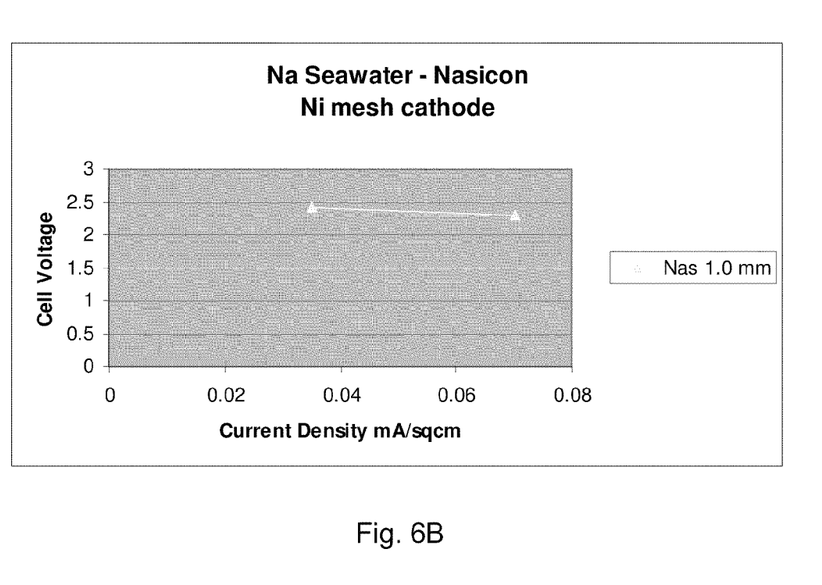

In a first example, 2 galvanic cells were prepared according to the described methods. While each cell was substantially identical, a first cell comprised a lithium anode and a LiSICON membrane while a second cell comprised a sodium anode and a NaSICON membrane. Both cells were placed in a 4% sodium chloride aqueous solution in which the pressure of oxygen was not specifically controlled. In this example, the current density of the first and second cells was then plotted against cells' voltage, as shown in FIGS. 6A and 6B, respectively. Specifically, FIG. 6A illustrates that the voltage of the first cell containing a Li anode was measured to be between about 2.5 and about 3 volts. Additionally, FIG. 6B illustrates that the voltage of the second cell containing a Na anode was measured to be between about 2 and about 2.5 volts. Accordingly, this example, shows that, in at least some embodiments, the lithium cell may produce a higher voltage where the cell comprises a lithium anode and a LiSICON membrane than a corresponding cell comprising a sodium anode and a NaSICON membrane.

Example 2

Figure 6C:
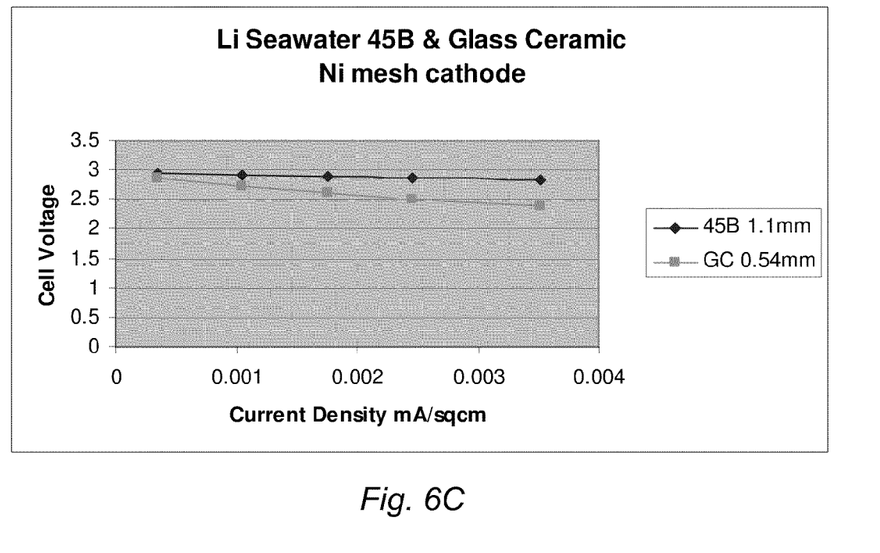
FIG. 6C contains a graph depicting non-limiting experimental results in which the current density is plotted against the cell voltage for a cell comprising a LiSICON membrane and a cell comprising a glass ceramic membrane.

In a second example, FIG. 6C contains a graph in which the cell voltage of two cells are plotted against the cells' current density. While the cells used for this graph are substantially similar, the first cell comprises a LiSICON membrane (45B) while the second cell comprises a glass ceramic membrane (GC). Despite the cells' similarities, FIG. 6C shows that the first cell with the LiSICON membrane (45B) produced a higher voltage than did the second cell, which had the glass ceramic membrane (GC). While this difference in cell voltage may be due to a variety of factors, it is theorized that the first cell's increased voltage is a result of its LiSICON membrane having a lower interfacial resistivity than the glass ceramic membrane in the second cell.

Example 3

Figure 7:
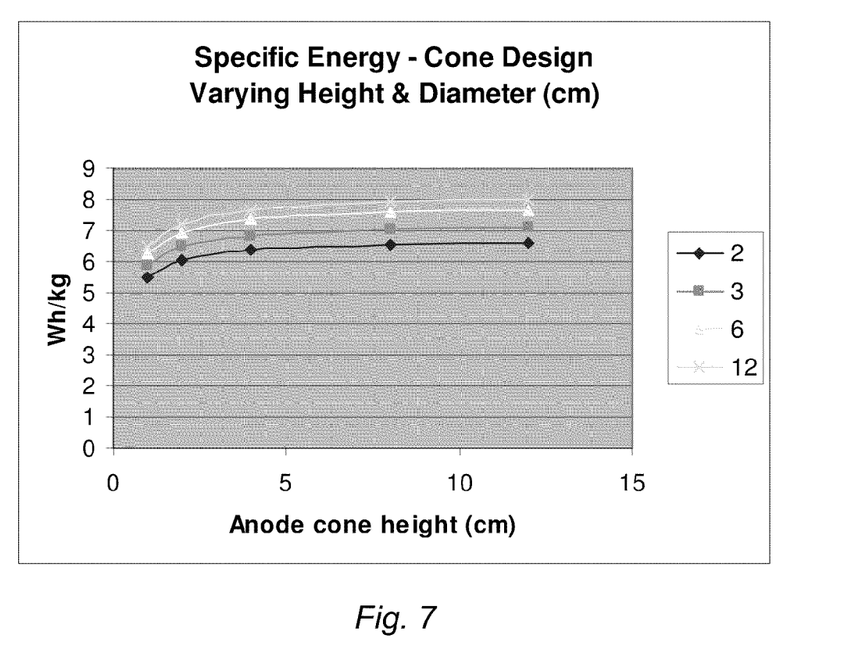
FIG. 7 contains a graph illustrating an estimated specific energy as a function of cone height and diameter for some embodiments of the galvanic cell.

In a third example, FIG. 7 illustrates a graph depicting estimated specific energies of different sizes of the described cell as a function of the cells' membrane cone height and diameter. In this example, the weights used for the calculations included the weights of a lithium anode, the current collectors, and a 300 micron thick membrane. Based on the estimates shown in FIG. 7, that figure shows that, in some embodiments, the cone height is preferably greater than about 4 cm and that the specific energy of the cells may also increase with the cones' diameters.

Example 4

Figure 8:
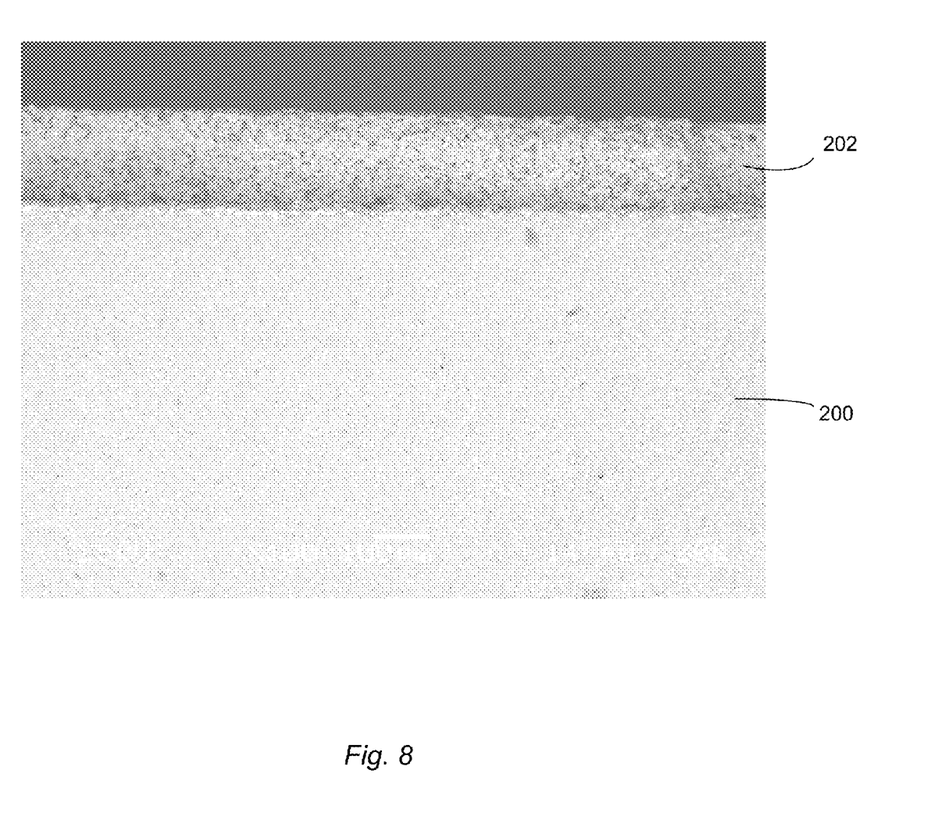
FIG. 8 shows a photomicrograph of a NaSICON/Ni cermet attached to a NaSICON membrane.

In a fourth example, FIG. 8 shows a NaSICON membrane 200 in which a porous NaSICON/nickel cermet 202 was formed, approximately 180 microns thick on one side. FIG. 8 shows the membrane 200/cermet 202 cross-section at approximately 100× magnification. The NaSICON/nickel cermet was prepared first producing the ceramic NaSICON membrane, then screen printing a layer of ceramic particles and metal particles, then firing the construct in a non-oxidizing environment. This method resulted in the cermet structure attached to the NaSICON membrane depicted in FIG. 8. An alternative method involves forming a ceramic tape consisting of membrane ceramic particles, organic binder and plasticizer, then a second tape comprised of the same materials as the first tape and a metal oxide, then laminating the two tapes together, and then sintering the laminate at elevated temperature for a period of time to drive off the binder and plasticizer, leaving the ceramic membrane attached to a layer consisting of ceramic particles and metal oxide particles. Exposing the oxide to a reducing agent then can reduce the metal oxide to metal and water, leaving behind a porous structure with a interconnected ionically conductive ceramic and electronically conductive metal.

While specific embodiments and examples of the present invention have been illustrated and described, numerous modifications come to mind without significantly departing from the spirit of the invention, and the scope of protection is only limited by the scope of the accompanying claims.

The invention claimed is:
1. A galvanic cell, comprising:
an alkali metal anode that electrochemically oxidizes to release alkali metal ions;
an anode current collector which is in electrical communication with the alkali metal anode;
a cathode suitable to evolve hydrogen from an aqueous electrolyte solution, wherein the cathode comprises a cermet;
an alkali-ion-conductive ceramic membrane that is impermeable to water and which separates the alkali metal anode from the cathode; and a biasing member that urges the alkali metal anode against a surface of the current collector as the alkali metal anode is depleted.

2. The galvanic cell of claim 1, wherein the alkali metal anode comprises a lithium metal.

3. The galvanic cell of claim 2, wherein the alkali-ion-conductive membrane comprises a ceramic material selected from a LiSICON membrane, a lithium-ion-conductive glass ceramic, and a combination thereof.

4. The galvanic cell of claim 1, wherein the alkali metal anode comprises a sodium metal.

5. The galvanic cell of claim 4, wherein the alkali-ion-conductive membrane comprises a ceramic material selected from a NaSICON membrane, a sodium-ion-conductive glass ceramic, and a combination thereof.

6. The galvanic cell of claim 1, wherein the galvanic cell is disposed in the aqueous electrolyte solution so that the cathode is in contact with the electrolyte solution.

7. The galvanic cell of claim 1, wherein the aqueous electrolyte solution is selected from seawater, brine, salt water, ionically conductive freshwater, and combinations thereof.

8. The galvanic cell of claim 1, wherein the cermet is porous.

9. The galvanic cell of claim 1, wherein the anode current collector is permeable to the alkali metal ions from the alkali metal anode.

10. The galvanic cell of claim 1, wherein the alkali-ion-conductive membrane comprises a hollow, three-dimensional tapered conical, hemispherically domed, or pyramidal structure having an interior surface and an exterior surface, wherein the alkali metal anode is disposed adjacent to the interior surface and the cathode is disposed adjacent to the exterior surface.

11. The galvanic cell of claim 10, wherein a cermet material is disposed adjacent to the exterior surface of the alkali-ion-conductive membrane.

12. The galvanic cell of claim 11, wherein the cermet material is porous.

13. The galvanic cell of claim 1, wherein the biasing member comprises an inflatable bladder.

14. The galvanic cell of claim 1, further comprising an electronically-insulative separator that is permeable to the alkali ions from the alkali metal anode and which is disposed between the alkali metal anode and the alkali-ion-conductive membrane.

15. The galvanic cell of claim 14, wherein the electronically-insulative separator is selected from a solid polymer electrolyte and a polymer mesh that is infiltrated with an organic solvent and an alkali salt.

16. A battery, comprising:
a plurality of galvanic cells, comprising:
an alkali metal anode that electrochemically oxidizes to release alkali metal ions;
an anode current collector that is permeable to the alkali metal ions from the alkali metal anode and which is in electrical communication with the alkali metal anode;
a cathode suitable to evolve hydrogen from an aqueous electrolyte solution;
an alkali-ion-conductive membrane that is impermeable to water, wherein the membrane comprises a hollow, three-dimensional tapered conical, hemispherically domed, or pyramidal structure having an interior surface and an exterior surface, wherein the alkali metal anode is disposed adjacent to the interior surface and the cathode is disposed adjacent to the exterior surface; and
a biasing member that urges the alkali metal anode against a surface of the current collector as the alkali metal anode is depleted, wherein the plurality of galvanic cells are joined together.

17. The battery of claim 16, wherein the plurality of galvanic cells joined together are organized such that hydrogen gas that evolves from the cathode will bubble and cause the aqueous electrolyte solution with an alkali hydroxide to be replaced with a fresh amount of the electrolyte solution.

18. The battery of claim 16, wherein the cathode comprises a cermet material.

19. The battery of claim 18, wherein the cermet material is porous.

20. The battery of claim 16, wherein the biasing member comprises an inflatable bladder connected to a reservoir.

21. The battery of claim 16, wherein the alkali metal anode comprises a lithium metal and wherein the alkali-ion-conductive membrane comprises a LiSICON membrane.

22. The battery of claim 16, wherein the alkali metal anode comprises a sodium metal and wherein the alkali-ion-conductive membrane comprises a NaSICON membrane.

23. The battery of claim 16, wherein the conductive membrane comprises:
a core comprising a non-porous alkali-ion-conductive membrane; and
an outer layer comprising a porous alkali-ion-conductive membrane having a porosity between about 0.5 and about 30%.

24. A galvanic cell, comprising:
an anode comprising lithium, wherein the anode electrochemically oxidizes to release lithium ions;
an anode current collector which is in electrical communication with the anode;
a cermet cathode suitable to evolve hydrogen from an aqueous electrolyte solution;
a LiSICON ceramic membrane that is impermeable to water, wherein the membrane comprises a hollow, three-dimensional tapered conical, hemispherically domed, or pyramidal structure having an interior surface and an exterior surface, and wherein the anode is disposed adjacent to the interior surface and the cathode is disposed adjacent to the exterior surface; and
a biasing member that urges the anode against a surface of the current collector as the anode is depleted.

25. The galvanic cell of claim 24, wherein the anode current collector is porous.

26. The galvanic cell of claim 24, wherein the anode comprises a cermet material.

27. A galvanic cell, comprising:
an anode comprising lithium, wherein the anode electrochemically oxidizes to release lithium ions;
an anode current collector which is in electrical communication with the anode;
a cermet cathode suitable to evolve hydrogen from an aqueous electrolyte solution;
a NaSICON ceramic membrane that is impermeable to water, wherein the membrane comprises a hollow, three-dimensional tapered conical, hemisperically domed, or pyramidal structure having an interior surface and an exterior surface, and wherein the anode is disposed adjacent to the interior surface and the cathode is disposed adjacent to the exterior surface; and
a biasing member that urges the anode against a surface of the current collector as the anode is depleted.

28. The galvanic cell of claim 27, wherein the anode current collector is porous.

29. The galvanic cell of claim 27, wherein the anode comprises a cermet material.

30. A galvanic cell, comprising:
a sodium metal anode that electrochemically oxidizes to release sodium metal ions;
an anode current collector in electrical communication with the sodium metal anode;
a cathode suitable to evolve hydrogen from an aqueous electrolyte solution;
a sodium-ion-conductive ceramic membrane that is impermeable to water and which separates the sodium metal anode from the cathode; and
a biasing member that urges the sodium metal anode against a surface of the current collector as the sodium metal anode is depleted, wherein the biasing member is a flexible membrane that is impermeable to water.

31. The galvanic cell of claim 30, wherein a liquid comprising water backfills behind the flexible membrane as the cell discharges.

32. A galvanic cell, comprising:
an alkali metal anode that electrochemically oxidizes to release alkali metal ions;
an anode current collector which is in electrical communication with the alkali metal anode;
a cathode suitable to evolve hydrogen from an aqueous electrolyte solution;
an alkali-ion-conductive ceramic membrane that is impermeable to water and which separates the alkali metal anode from the cathode, wherein the alkali-ion-conductive membrane comprises a hollow, three-dimensional tapered conical, hemispherically domed, or pyramidal structure having an interior surface and an exterior surface, wherein the alkali metal anode is disposed adjacent to the interior surface and the cathode is disposed adjacent to the exterior surface; and
a biasing member that urges the alkali metal anode against a surface of the current collector as the alkali metal anode is depleted.

33. The galvanic cell of claim 32, wherein the alkali metal anode comprises a lithium metal.

34. The galvanic cell of claim 33, wherein the alkali-ion-conductive membrane comprises a ceramic material selected from a LiSICON membrane, a lithium-ion-conductive glass ceramic, and a combination thereof.

35. The galvanic cell of claim 32, wherein the alkali metal anode comprises a sodium metal.

36. The galvanic cell of claim 35, wherein the alkali-ion-conductive membrane comprises a ceramic material selected from a NaSICON membrane, a sodium-ion-conductive glass ceramic, and a combination thereof.

37. The galvanic cell of claim 32, wherein the aqueous electrolyte solution is selected from seawater, brine, salt water, ionically conductive freshwater, and combinations thereof.

38. The galvanic cell of claim 32, wherein the cathode comprises a porous cermet.

39. The galvanic cell of claim 32, further comprising an electronically-insulative separator that is permeable to the alkali ions from the alkali metal anode and which is disposed between the alkali metal anode and the alkali-ion-conductive membrane.

40. The galvanic cell of claim 39, wherein the electronically-insulative separator is selected from a solid polymer electrolyte and a polymer mesh that is infiltrated with an organic solvent and an alkali salt.

41. A galvanic cell, comprising:
an alkali metal anode that electrochemically oxidizes to release alkali metal ions;
an anode current collector which is in electrical communication with the alkali metal anode;
a cathode suitable to evolve hydrogen from an aqueous electrolyte solution, wherein the cathode comprises a cermet;
an alkali-ion-conductive ceramic membrane that is impermeable to water and which separates the alkali metal anode from the cathode;
a biasing member that urges the alkali metal anode against a surface of the current collector as the alkali metal anode is depleted; and
an electronically-insulative separator that is permeable to the alkali ions from the alkali metal anode and which is disposed between the alkali metal anode and the alkali-ion-conductive membrane.

42. The galvanic cell of claim 41, wherein the alkali metal anode comprises a lithium metal.

43. The galvanic cell of claim 41, wherein the alkali metal anode comprises a sodium metal.

44. The galvanic cell of claim 41, wherein the alkali-ion-conductive membrane comprises a ceramic material selected from a LiSICON membrane, a lithium-ion-conductive glass ceramic, and a combination thereof.

45. The galvanic cell of claim 41, wherein the alkali-ion-conductive membrane comprises a ceramic material selected from a NaSICON membrane, a sodium-ion-conductive glass ceramic, and a combination thereof.

46. The galvanic cell of claim 41, wherein the aqueous electrolyte solution is selected from seawater, brine, salt water, ionically conductive freshwater, and combinations thereof.

47. The galvanic cell of claim 41, wherein the cathode comprises a porous cermet.

48. The galvanic cell of claim 41, wherein the anode current collector is permeable to the alkali metal ions from the alkali metal anode.

49. The galvanic cell of claim 41, further comprising an electronically-insulative separator selected from a solid polymer electrolyte and a polymer mesh that is infiltrated with an organic solvent and an alkali salt.

* * * * *